United States Patent
Lu et al.

(10) Patent No.: US 7,034,290 B2
(45) Date of Patent: Apr. 25, 2006

(54) TARGET SUPPORT WITH PATTERN RECOGNITION SITES

(75) Inventors: Jennifer Lu, Sunnyvale, CA (US); Timothy H. Joyce, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/949,688

(22) Filed: Sep. 24, 2004

(65) Prior Publication Data

US 2006/0065828 A1   Mar. 30, 2006

(51) Int. Cl.
*C30B 1/00* (2006.01)

(52) U.S. Cl. .................. 250/288; 250/427; 250/423 R; 438/510; 438/535; 313/309

(58) Field of Classification Search ..................... None
See application file for complete search history.

(56) References Cited

U.S. PATENT DOCUMENTS

| 6,885,010 B1 * | 4/2005 | Traynor et al. ............. 250/427 |
| 2004/0033679 A1 * | 2/2004 | Jacobson et al. ........... 438/510 |
| 2004/0175631 A1 * | 9/2004 | Crocker et al. ................ 430/5 |

OTHER PUBLICATIONS

Lustig et al., Title: "Lithographically Cut Single-Walled Carbon Nanotubes: Controlling Length Distribution And Introducing End-Group Functionality", Nano Letters, 2003, vol. 3, No. 8, pp. 1007-1012.
Bradley et al., Title: "Charge Transfer From Adsorbed Proteins", Nano Letters, 2004, vol. 4, No. 2, pp. 253-256.
Melosh et al., Title: "Ultrahigh-Density Nanowire Lattices And Circuits", Science, 2003,vol. 300, pp. 112-115.
Huang et al., Title: "Growth Of Large Periodic Arrays Of Carbon Nanotubes", Applied Physics Letters, 2003, vol. 82, pp. 460-462.
Ericson et al., Title: "Single-Wall Carbon Nanotube Films", Chem. Mater, 2003, vol. 15, pp. 175-178.
Chen et al., Title: "Noncovalent Sidewall Functionalization Of Single-Walled Carbon Nanotubes For Protein Immobilization", J. Am. Chem. Soc., 2001, vol. 123, pp. 3838-3839.
Dai, Title: "Carbon Nanotubes: Synthesis, Integration, And Properties", Acc. Chem. Res., 2002, vol. 35, pp. 1035-1044.
Saito et al., Title: Physical Properties Of Carbon Nanotubes, Imperial Collage Press, pp. 73-83.

(Continued)

*Primary Examiner*—Nikita Wells
*Assistant Examiner*—Zia R. Hashmi
(74) *Attorney, Agent, or Firm*—Timothy H. Joyce

(57) ABSTRACT

The invention provides a substrate for use in an ion source of a mass spectrometer system. The substrate may be employed independently or in conjunction with an ion source or a mass spectrometry system. A substrate is provided having at least one pattern recognition site and a carbon nanotube adjacent to the pattern recognition site. Methods of making and ionizing samples using the pattern recognition site and carbon nanotube surface are also disclosed.

18 Claims, 3 Drawing Sheets

OTHER PUBLICATIONS

Flory, Title: "Apparatus And Method For Biopolymer Identification During Translocation Through A Nanopore", U.S. Appl. No. 10/352,675, filed: Jan. 27, 2003, Agilent's Ref.: 10030031-1.

* cited by examiner

TARGET SUPPORT WITH PATTERN RECOGNITION SITES

TECHNICAL FIELD

The invention relates generally to the field of mass spectrometry and more particularly toward supports for improved ionization and production of analyte ions. In particular, the invention relates to ionization techniques such as atmospheric pressure matrix assisted laser desorption (AP-MALDI) and matrix assisted laser desorption (MALDI).

BACKGROUND

Most complex biological and chemical targets require the application of complementary multidimensional analysis tools and methods to compensate for target and matrix interferences. Correct analysis and separation is important to obtain reliable quantitative and qualitative information about a target. In this regards, mass spectrometers have been used extensively as detectors for various separation methods. However, until recently most spectral methods provided fragmentation patterns that were too complicated for quick and efficient analysis. The introduction of atmospheric pressure ionization (API) and matrix assisted laser desorption ionization (MALDI) have improved results substantially. These methods significantly reduce fragmentation patterns and provide high sensitivity for determining the identity of a variety of compounds. Matrix based ionization techniques have been particularly effective regarding peptides, proteins, carbohydrates, oligosaccharides, natural products, cationic drugs, cyclic glucans, taxol, taxol derivatives, metalloproteins, porphyrins, kerogens, polymers and other biological and non-biological compounds.

Accordingly, in the MALDI or AP-MALDI ionization method, the analyte and matrix in solution is applied to a probe or target substrate. As the solvent evaporates, the analyte and matrix co-precipitate out of solution to form a crystal of the analyte in the matrix on the target substrate. The co-precipitate is then irradiated with a short laser pulse inducing the accumulation of a large amount of energy in the co-precipitate through electronic excitation or molecular vibration of matrix molecules. The matrix dissipates the energy by desorption, carrying the analyte into the gaseous phase. During this desorption process, ions are formed by charge transfer between the photo-excited matrix and analyte although the mechanism of the process is not well known.

MALDI ionization is typically performed using a time-of-flight analyzer. Other mass analyzers such as an ion trap (ion trap is a way of capturing ions and thus is not a detector), an ion cyclotron resonance mass spectrometer and quadrupole time-of-flight are also used. These spectrometers have a number of problems because they are required to operate under high vacuum. For instance, they limit target throughput, reduce resolution, capture efficiency and make testing targets more difficult and expensive to perform.

To overcome the disadvantages described above, another technique call AP-MALDI has been developed. This technique performs similar ionizations, but at atmospheric pressure. The MALDI and AP-MALDI ionization techniques have much in common. These techniques are based on the process of a pulsed laser beam desorption/ionization of a solid-state target material resulting in production of gas phase analtye molecular ions. The ion plume is produced as a result of ionization from a solid support or plate.

A number of techniques and components have been designed to try to improve the sensitivity of these instruments. For instance, heat or heated gas flow has been introduced into the chamber or ionization region to improve the ionization process. In addition, different type plates have been developed to improve ionization. For instance, various materials have been employed to increase the hydrophobicity of the materials used on the plate surface. Improvements of the surface or surface composition have been useful in improving the overall efficiency of ion plume and ion production.

More recently, it has been suggested that carbon nanotubes or similar type materials may be employed for use with MALDI and AP-MALDI substrates or plates. Since carbon nanotubes are small it is particularly difficult to organize and view them on a surface under a conventional microscope. In particular, it would be desirable to more accurately control where analytes are spotted and grown as well as locate the carbon nanotubes on the plate surface for mass spectrometry analysis of deposited samples. These limitations and others have been obviated by the present invention.

SUMMARY OF THE INVENTION

The invention provides a mass spectrometry system comprising an ion source comprising a substrate disposed in the ion source and having an ionization surface with at least one pattern recognition site and a carbon nanotube attached to the substrate adjacent to the pattern recognition site; a laser for ionizing the sample on the carbon nanotube attached to the substrate; and a detector downstream from the ion source for detecting the ions produced by the ion source.

The invention also provides an ion source for ionizing a sample, comprising a substrate disposed in the ion source having an ionization surface with at least one pattern recognition site and a carbon nanotube attached to the substrate adjacent to the pattern recognition site; and a laser for ionizing the sample on the carbon nanotube attached to the substrate.

The invention provides a substrate for use in an ion source of a mass spectrometer system, comprising an ionization surface on the substrate having at least one pattern recognition site and a carbon nanotube adjacent to the pattern recognition site.

The invention also provides a method of making a mass spectrometry system, comprising providing an ion source comprising a laser, a substrate having a surface with at least one pattern recognition site and a carbon nanotube attached to the surface adjacent to the pattern recognition site; and providing a detector downstream from the ion source for detecting the ions produced by the ion source.

The invention provides a method for ionizing a sample, comprising providing a substrate having a surface with at least one pattern recognition site, applying a carbon nanotube adjacent to the pattern recognition site, applying a sample to the carbon nanotube adjacent to the pattern recognition site, and ionizing the sample on the carbon nanotube.

BRIEF DESCRIPTION OF THE FIGURES

The invention is described below with reference to the following figures.

DETAILED DESCRIPTION OF THE INVENTION

Figure 1:
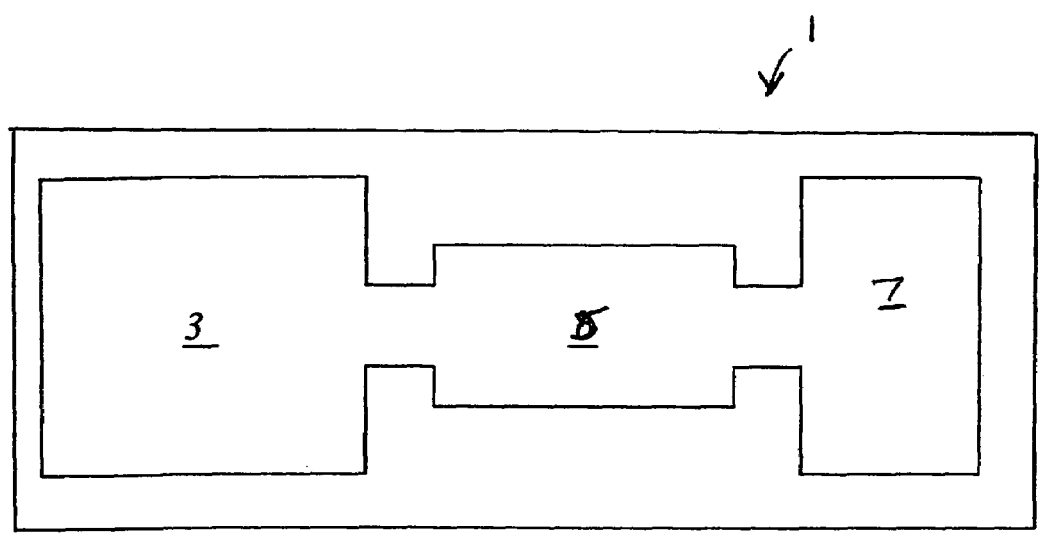
FIG. 1 shows a general block diagram of a mass spectrometer.

Before describing the invention in detail, it must be noted that as used in this specification and the appended claims, the singular forms, "a", "an", and "the" include plural referents unless the context clearly dictates otherwise. Thus, for example, reference, to "a MALDI plate" include more than one "MALDI plate". Reference to a "matrix" includes more than one "matrix" or a mixture of "matrixes". In describing and claiming the present invention, the following terminology will be used in accordance with the definitions set out below.

The term "adjacent" means, near, next to or adjoining. Something adjacent may also be in contact with another component, surround the other component, be spaced from the other component or contain a portion of the other component. For instance, a carbon nanotube that is adjacent to a surface or plate, may be next to the surface or plate, on the surface or plate, embedded in the surface or plate, fixed to the surface or plate, contact the surface or plate, surround the surface or plate, comprise a portion of the surface or plate.

The term "ion source" or "source" refers to any source that produces analyte ions. Ion sources may comprise other sources besides AP-MALDI ion sources such as electron impact (herein referred to as EI), chemical ionization (CI) and other ion sources known in the art.

The term "matrix based" or "matrix based ion source" refers to an ion source or mass spectrometer that does not require the use of a drying gas, curtain gas, or desolvation step. For instance, some systems require the use of such gases to remove solvent or cosolvent that is mixed with the analyte. These systems often use volatile liquids to help form smaller droplets. The above term applies to both nonvolatile liquids and solid materials in which the sample is dissolved. The term includes the use of a cosolvent. Cosolvents may be volatile or non-volatile, but must render the final matrix material capable of evaporating in vacuum. Such materials would include, and not be limited to m-nitrobenzyl alcohol (NBA), glycerol, triethanolamine (TEA), 2,4-dipentylphenol, 1,5-dithiothrietol/dierythritol (magic bullet), 2-nitrophenyl octyl ether (NPOE), thioglycerol, niconinic acid, cinnamic acid, 2,5-dihydroxy benzoic acid (DHB), 3,5-dimethoxy-4-hydroxycinnamic acid (sinpinic acid), a-cyano-4-hydroxycinnnnamic acid (CCA), 3-methoxy-4-dydroxycinnamic acid (ferulic acid), monothioglycerol, carbowax, 2-(4-hydroxyphenylazo)benzoic acid (HABA), 3,4-dihydroxycinnamic acid (caffeic acid), 2-amino-4-methyl-5-nitropyridine and their cosolvents and derivatives. In particular, the term refers to MALDI, AP-MALDI, fast atom/ion bombardment (FAB) and other similar systems that do not require a volatile solvent and may be operated above, at and below atmospheric pressure.

The term "detector" refers to any device, apparatus, machine, component, or system that can detect an ion. Detectors may or may not include hardware or software. In a mass spectrometer the common detector includes and/or is coupled to a mass analyzer.

The term "structured" refers to the positioning of carbon nanotube components in any defined or orderly arrangement that is not random. For instance, the carbon nanotubes may be stacked in a defined fashion, layered, or positioned so as to define a particular structure. In addition, they may be grown or created to form various arrays, or ordered structures that are parallel, perpendicular or other arrangements that stack in one, two or three dimensions.

The term "surface modified" refers to modifying any surface with a carbon nanotube material. This requires more than simple application or layering on the surface. For instance, surface modification may comprise attachment to the surface by van deer waals forces, ionic bonds, covalent bonds, hydrogen bonding, or any other chemical bonding or methods. The modifications may or may not be permanent and in some cases may be reversible.

The invention is described with reference to the figures. The figures are not to scale, and in particular, certain dimensions may be exaggerated for clarity of presentation.

FIG. 1 shows a general block diagram of a mass spectrometry system. The block diagram is not to scale and is drawn in a general format because the present invention may be employed with a variety of different types of mass spectrometers. The mass spectrometry system 1 of the present invention comprises an ion source 3, an ion transport system 5, and an ion detector 7. The ion detector 7 is positioned downstream from the ion transport system 5.

The ion source 3 provided by the present invention may comprise a variety of different ion sources known in the art. For instance, a typical ion source 3 may comprise a matrix assisted laser desorption ionization source (MALDI), or atmospheric pressure matrix assisted laser desorption ionization source (AP-MALDI). In particular the invention is useful with an ion source that provides a laser or light source. Other potential sources may comprise electron ionization (EI), chemical ionization (CI), atmospheric pressure photo ionization (APPI), atmospheric pressure chemical ionization (APCI) and combinations of these devices. The invention may comprise or utilize any ion sources known or not known yet in the art which comprise a laser or the production of an ion plume, or perform a particular surface ionization or production of ion plume from a surface. The invention has potential application with multimode ionization sources that may use various combinations of ion sources. The ion source 3 may be positioned in a variety of positions and locations within the mass spectrometry system 1.

Figure 2:
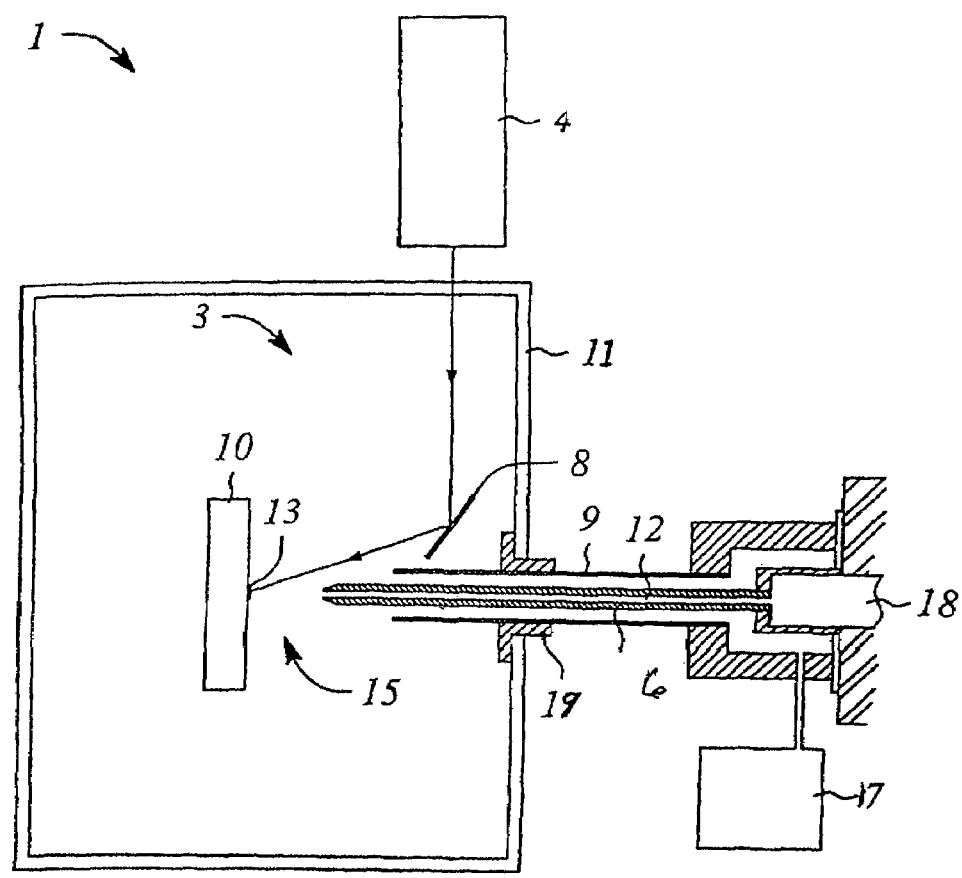
FIG. 2 shows a first embodiment of the present invention.

The ion transport system 5 is adjacent to the ion source 3 and may comprise a variety of devices known in the art (See FIG. 2). For instance, the ion transport system 5 may comprise a collecting capillary 6 or any ion optics, conduits or devices that may transport ions and that are well known in the art. Other devices that move ions from one position to another may be employed. These devices may or may not be under vacuum.

The ion detector 7 may comprise a variety of different types of detectors known in the art. The detector 7 may comprise a portion of the transport system 5 or may comprise an independent device. The ion detector 7 is design to detect the presence, quantity and type of ions produced by the mass spectrometry system 1.

FIG. 2 shows a cross-sectional view of a first embodiment of the invention. The figure shows the present invention applied to an AP-MALDI mass spectrometry system. For simplicity the figure shows the invention combined with a source housing 11. The use of a source housing 11 to enclose the ion source 3 and system is optional. Certain parts, components and systems may or may not be under vacuum. These techniques and structures are well known in the art.

The typical ion source 3 may comprise a laser 4, and a target support 10. A target 13 is applied to the target support 10. In certain embodiments the target support 10 may comprise just a substrate and a surface for applying the target 13. In other embodiments, a support plate may comprise or comprise a portion of the target support 10. The target 13 may or may not be in a matrix material. The laser 4 provides a laser beam toward the target 13. The laser beam is directed from the laser 4 toward the target support 10 and target 13. An optional reflector 8 may be employed. The target 13 is then ionized and the analyte ions are released as an ion plume into the ionization region 15.

The ionization region 15 is located between the ion source 3 and the collecting capillary 6. The ionization region 15 comprises the space and area located in the area between the ion source 3 and the collecting capillary 6. Collecting capillary 6 may be enclosed by an optional gas conduit 19. An inert gas may be supplied to the ionization region 15 by gas conduit 9. The gas may be supplied by gas source 17. The ionization region 15 contains the ions produced by ionizing the sample that are vaporized into the gas phase. This region can be adjusted in size and shape depending upon how the ion source 3 is arranged relative to the collecting capillary 6. Most importantly, located in this region are the analyte ions produced by ionization of the target 13.

The collecting capillary 6 is located downstream from the ion source 3 and may comprise a variety of materials and designs that are well known in the art. The collecting capillary 6 is designed to receive and collect analyte ions produced from the ion source 3 that are discharged as an ion plume into the ionization region 15. The collecting capillary 6 has an elongated bore that receives the analyte ions and transports them to another capillary, or location.

Important to the invention is target support 10. Target support 10 is designed to hold or maintain a target 13. The target support 10 may comprise or be coated with a carbon nanotube material of the present invention. In order to deposit or position the carbon nanotubes on the target support 10, a pattern recognition site 14 may be applied to the surface to form a recognition pattern (See FIGS. 2–3). The pattern recognition site 14 and/or pattern may be applied in a variety positions. In addition, the actual site may comprise a variety of shapes or sizes. The overall function and important property of the pattern recognition site 14 is to be able to position various materials on the surface. For instance, the site may be used to seed various carbon nanotubes to grow or develop on the surface. Other materials known in the art for target support modification may also be employed alone or in combination with the carbon nanotubes. The pattern recognition site 14 helps in matrix development and for identification and ordering of carbon nanotube patches. In addition, the carbon nanotube patches are not easily seen using a CCD camera and, therefore, the pattern recognition site 14 helps in location and identification of the applied material or carbon nanotube patch 20.

Carbon nanotubes are extremely hydrophobic and have the capability of absorbing UV energy. These characteristics of carbon nanotubes are essential for the possible matrixless biomolecular detection. The carbon nanotube surface is important to the invention and is attached to or comprises an ionization surface (surface modification). From a functional standpoint this may include covalent attachment or strong van der waals forces. In certain instances the carbon nanotube material may be grown on the surface. However, this is not required. In certain instances the carbon nanotube material may be sprayed on the surface or applied as a coating. The carbon nanotube material creates a surface for improved ionization or production of ion plume. The hydrophobic carbon nanotube surface may be used to make ionization from the target support 10 more efficient. Since after the growth of carbon nanotubes, the surface becomes slightly roughened and provides a very large surface area as a result. This may promote the dispersion of analyte and matrix. There has been a considerable amount of investigation into the use of porous materials as MALDI plates. Carbon nanotubes provide not only a hydrophobic surface but a large surface area with strong absorption at 334 nm.

Typically, carbon nanotubes can grow on a layer of transition metal catalyst pre-deposited on a substrate at optimal temperature and pressure. Carbon nanotubes can also be directly coated on a chemically modified surface. There are a number of techniques for the preparation of carbon nanotubes. For instance, single walled carbon nanotube have been prepared as discussed by Ericson et al., *Chem. Mater.* 2003, 15, 175–178, 2003; Huang, Z. P., Applied Physics Letters, Volume 82, Number 3, Jan. 20, 2003; Melosh et al., Science, Volume 300, Apr. 4, 2003; Chen, R. J., *J. Am. Chem. Soc.* 2001, 123, 3838–3839; Bradley, K., NanoLetters Vol. 0. No. 0 A–D, Nov. 5, 2003; Lustig, S. R., Nanoletters, Vol. 3, No. 8, 1007–1012, 2003. In other cases, multiple walled carbon nanotubes have also been developed and employed. A number of techniques for preparing these types of nanotubes are also known and disclosed in the literature. Carbon nanotubes largely comprise a ring structure organized in a variety of ways. For instance, they may be ordered at the atomic level as well as to form larger ordered structures and/or supramolecular structures. These various ordered structures are applicable to the present invention and improve over the prior art in providing more efficient ion plume. Other methods and techniques known and developed in the art may be employed. The technique has other potential applications for preparation of semiconductor substrates, other devices used for biopolymer resonant tunneling or microfluidics. For further information regarding biopolymer resonant tunneling techniques please see Ser. No. 10/352,675 filed Jan. 27, 2003 entitled "Apparatus and Method for Biopolymer Identification and Translocation through a Nanopore". These references are herein incorporated by reference in their entirety.

EXAMPLE 1

Carbon nanotubes can be synthesized and grown by various techniques known in the literature. Some of the well known methodologies include High Pressure CO Conversion (HiPCO), Pulsed-Laser Vaporization (PLV), Arc Discharge and Chemical Vapor Deposition (CVD). The first three methods only produce tangled nanotubes mixed with byproduct. The chemical vaporization technique provides the best methodology to obtain ordered and controlled carbon nanotube density with relatively pure carbon nanotubes. H. Dai, ACC. Chem. Res. 2002, 35, 1035–1044; R. Saito et al, "Physical Properties of Carbon Nanotubes" Imperial College Press.

The chemical vapor method utilizes hydrocarbon gases ($CH_4$, $CO$, $C_6H_6$, $C_2H_5OH$ et al) as a carbon stock and metal catalysts (Fe, Fe/Mo, Co, Co/Mo, Ni et al) as a "seed" to grow carbon nanotubes at 500° C. ~1200° C. To get a desired carbon nanotube density and to grow carbon nanotubes on predefined locations, one must control the distribution, density and location of seeds. Seeds can be controlled logically by the polymer carrier approaches.

In these approaches, a polymer is employed as a binder to disperse a catalyst uniformly across the wafer by a spin coating method. Catalysts can be either attached or otherwise complexed to the repeat unit of one segment of a polymer or one of the homopolymer constituents. The molecular dispersion of the catalyst species insures the uniform distribution of catalyst across the wafer. The size of catalyst cluster, seed, after polymer removal is mainly determined by the catalyst containing chain length. The spacing between catalyst clusters is determined by either the dilution factor, the volume ratio of polymer segments or by conventional lithography technique. The distance between catalyst islands may be determined by E-beam or optical lithography. Through this approach, the population of carbon nanotubes can be controlled precisely and also the carbon nanotube size.

The example shows how carbon nanotubes may be grown on a surface. In particular, both the density, position and ordering of the materials may be controlled. This is important to the invention. In addition, the above technique may be applied to grow or "seed" carbon nanotubes on a MALDI or AP-MALDI plate.

Figure 3:
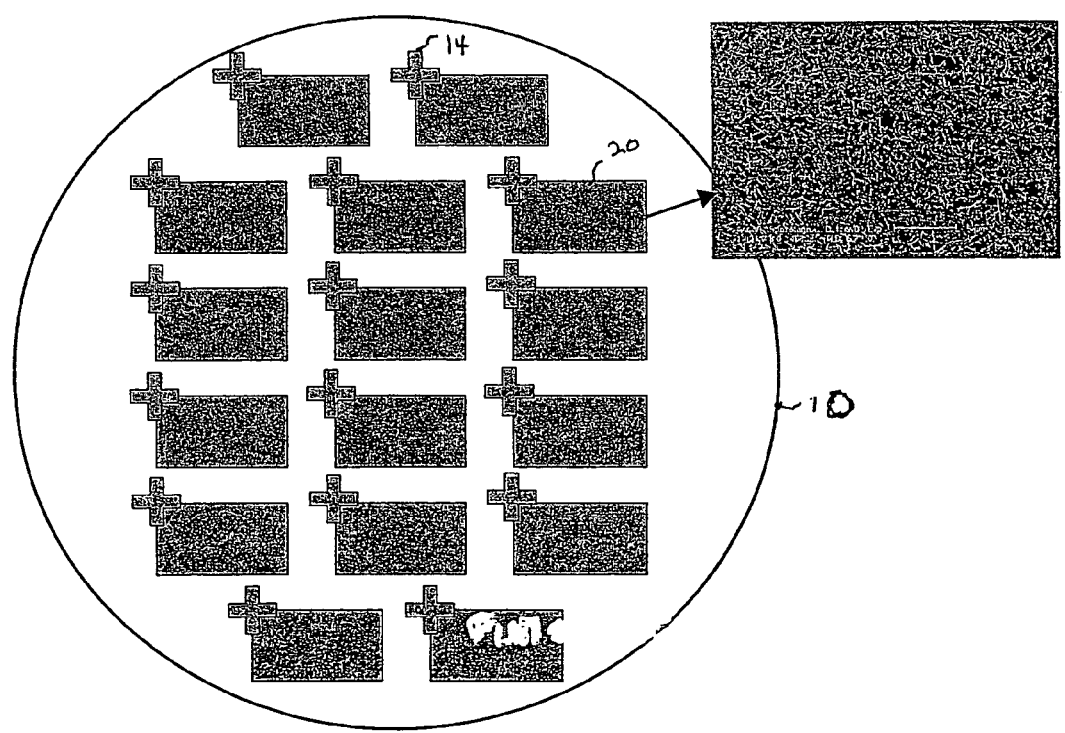
FIG. 3 shows a second embodiment of the present invention.

Having described the apparatus of the invention, a description of the method is now in order. FIGS. 2–3 show the results of the method of the present invention. In the first step an iron containing polymer is applied to the surface of the target support 10. Next, any machine known in the art can be employed to etch into or deposit onto the surface to generate a pattern recognition site 14. After the size, pattern and positioning of the sites are defined, a carbon nanotube patch 20 can be applied or grown adjacent to the patern recognition site 14. In addition, carbon nanotube growth can be done first and then followed by creating a pattern recognition site 14 by either etching or lift-off processing. This technique is very useful because a typical CCD camera can not detect a carbon nanotube surface. They are too small. This technique also helps in the event that the matrix is removed from the sample. It can be imagined in future MALDI, AP-MALDI or other device techniques that produce ion plume, that this type of pattern recognition site 14 would be used to locate and position samples on plates that are not easily seen or identified. The pattern recognition sites 14 may also be used to precisely control spotting of mass spectrometry analysis locations.

The invention also provides a method of making a mass spectrometry ionization substrate comprising providing a substrate, applying an iron containing polymer film to the substrate, etching into the substrate to generate a pattern recognition site and generating carbon nanotube adjacent to the pattern recognition site. In addition, the invention also provides a method of making an ion source, comprising providing a laser; providing a substrate, applying an iron containing polymer film to the substrate, etching into the substrate to generate a pattern recognition site and generating carbon nanotube adjacent to the pattern recognition site. The invention also provides a method of making a mass spectrometry system, comprising providing an ion source comprising, a laser, a substrate having a surface with at least one pattern recognition site; and a carbon nanotube attached to the surface and adjacent to the pattern recognition site, providing a detector downstream from the ion source for detecting the ions produced by the ion source. Lastly, the invention also provides a method for ionizing a sample, comprising providing a substrate having a surface with at least one pattern recognition site, applying a carbon nanotube adjacent to the pattern recognition site, applying a sample to the carbon nanotube material adjacent to the pattern recognition site and ionizing the sample on the carbon nanotube material.

We claim:

1. A substrate for use in an ion source of a mass spectrometer system, comprising:
   (a) an ionization surface on the substrate having at least one pattern recognition site; and
   (b) a carbon nanotube adjacent to the pattern recognition site at a predefined distance.

2. A substrate as recited in claim 1, wherein the pattern recognition site is etched into the surface of the substrate.

3. A substrate as recited in claim 1, wherein more than one pattern recognition site is position on the substrate surface.

4. An ion source for ionizing a sample, comprising:
   (a) a substrate disposed in the ion source and having an ionization surface with at least one pattern recognition site; and
   (b) a carbon nanotube attached to the substrate and adjacent to the pattern recognition site for holding a sample; and
   (c) a laser for ionizing the sample on the carbon nanotube attached to the substrate.

5. An ion source as recited in claim 4, wherein the ion source comprises an AP-MALDI source.

6. An ion source as recited in claim 4, wherein the ion source comprises a MALDI ion source.

7. A mass spectrometry system comprising:
   (a) an ion source comprising
      (i) a substrate disposed in the ion source and having an ionization surface with at least one pattern recognition site; and
      (ii) a carbon nanotube attached to the substrate and adjacent to the pattern recognition site for holding a sample;
   (b) a laser for ionizing the sample on the carbon nanotube attached to the substrate; and
   (c) a detector downstream from the ion source for detecting the ions produced by the ion source.

8. A mass spectrometry system as recited in claim 7, wherein the ion source comprises an AP-MALDI ion source.

9. A mass spectrometry system as recited in claim 7, wherein the ion source comprises a MALDI ion source.

10. A method of making a mass spectrometry ionization substrate comprising:
    (a) providing a substrate;
    (b) applying a metal containing polymer film to the substrate;
    (c) etching into the substrate to generate a pattern recognition site; and
    (d) generating a carbon nanotube adjacent to the pattern recognition site.

11. A method of making an ion source, comprising
    (a) providing a laser;
    (b) providing a substrate;
    (c) applying a metal containing polymer film to the substrate;
    (d) etching into the substrate to generate a pattern recognition site; and
    (e) generating a carbon nanotube adjacent to the pattern recognition site.

12. A method of making a mass spectrometry system, comprising:
    (a) providing an ion source comprising:
       (i) a laser;
       (ii) a substrate having a surface with at least one pattern recognition site; and
       (iii) a carbon nanotube attached to the surface and adjacent to the pattern recognition site;

(b) providing a detector downstream from the ion source for detecting the ions produced by the ion source.

13. A method for ionizing a sample, comprising:
(a) providing a substrate having a surface with at least one pattern recognition site;
(b) applying a carbon nanotube adjacent to the pattern recognition site'
(c) applying a sample to the carbon nanotube material adjacent to the pattern recognition site; and
(d) ionizing the sample on the carbon nanotube.

14. A method for ionizing a sample as recited in claim 13, wherein the ionization takes place by applying a laser beam to the sample on the carbon nanotube material.

15. The method of claim 14, wherein the ionization takes place at high pressure.

16. The method of claim 14, wherein the ionization takes place at low pressure.

17. The method of claim 14, wherein the ionization takes place at a pressure of from about 760 to about 1,000 Torr.

18. A method for making an apparatus for biopolymer resonant tunneling, comprising:
(a) providing a substrate;
(b) applying a metal containing polymer film to the substrate;
(c) etching into the substrate to generate a pattern recognition site;
(d) generating carbon nanotube adjacent to the pattern recognition site; and
(e) sculpting a nanopore adjacent to the carbon nanotube to produce an apparatus for biopolymer resonant tunneling.

* * * * *